(12) United States Patent
Bellmann et al.

(10) Patent No.: US 7,536,241 B2
(45) Date of Patent: May 19, 2009

(54) CONTROL DEVICE FOR A SYSTEM, AND METHOD FOR OPERATING THE CONTROL DEVICE

(75) Inventors: Holger Bellmann, Ludwigsburg (DE); Gudrun Menrad, Stuttgart (DE); Jürgen Wolf, Karlsruhe (DE); Heinz Hohl, legal representative, Karlsruhe (DE); Hans Hillner, Karlsruhe (DE); Juergen Schiemann, Markgroeningen (DE); Georg Mallebrein, Singen (DE)

(73) Assignee: Robert Bosch GmbH, Stuttgart (DE)

( * ) Notice: Subject to any disclaimer, the term of this patent is extended or adjusted under 35 U.S.C. 154(b) by 675 days.

(21) Appl. No.: 09/166,496

(22) Filed: Oct. 5, 1998

(65) Prior Publication Data

US 2002/0123828 A1 Sep. 5, 2002

(30) Foreign Application Priority Data

Oct. 7, 1997 (DE) ................................. 197 44 230

(51) Int. Cl.
*G05D 1/00* (2006.01)
(52) U.S. Cl. ..................................... 701/1; 701/3; 701/9
(58) Field of Classification Search ...................... 700/2, 700/7, 9, 12, 14, 19, 20, 306; 307/29, 31, 307/32, 33, 36; 709/103
See application file for complete search history.

(56) References Cited

U.S. PATENT DOCUMENTS

| | | | | |
|---|---|---|---|---|
| 4,642,756 A * | 2/1987 | Sherrod | ....................... | 709/103 |
| 4,653,003 A * | 3/1987 | Kirstein | ........................ | 701/29 |
| 4,787,041 A * | 11/1988 | Yount | ............................. | 701/3 |
| 4,794,537 A * | 12/1988 | Adasek et al. | ................. | 701/36 |
| 5,081,586 A * | 1/1992 | Barthel et al. | .................. | 701/49 |
| 5,337,013 A * | 8/1994 | Langer et al. | ................ | 324/337 |
| 5,416,702 A * | 5/1995 | Kitagawa et al. | .............. | 701/36 |
| 5,438,506 A * | 8/1995 | Oho et al. | ........................ | 700/9 |
| 5,548,774 A * | 8/1996 | Maurel | ........................ | 395/800 |
| 5,563,452 A * | 10/1996 | Kephart | ..................... | 307/10.1 |
| 5,636,124 A | 6/1997 | Rischar et al. | .............. | 700/100 |
| 5,951,619 A * | 9/1999 | Merl et al. | ................... | 701/115 |
| 5,964,811 A * | 10/1999 | Ishii et al. | ...................... | 701/29 |
| 5,991,669 A * | 11/1999 | Dominke et al. | ............... | 701/1 |
| 6,014,591 A * | 1/2000 | Ikeda | ............................. | 700/1 |
| 6,301,602 B1 * | 10/2001 | Ueki | .......................... | 709/103 |

FOREIGN PATENT DOCUMENTS

| | | |
|---|---|---|
| DE | 4209889 | 2/1993 |
| DE | 19513922 | 10/1995 |

(Continued)

OTHER PUBLICATIONS

Rate-Monotonic Analysis for Real-Time Industrial Computing, p. 24-32, Mark H. Klein, John P. Lehoczky, and Ragunathan Rajkumar, Carnegie Mellon University, 8153 Computer, Jan. 27, 1994, No. 1, Los Alamitos, CA, USA.

*Primary Examiner*—Khoi Tran
(74) *Attorney, Agent, or Firm*—Kenyon & Kenyon LLP

(57) ABSTRACT

A control device and a method for operating a control device which contains function modules, a scheduler and a priority manager. The control device is connected via data lines to a system to be controlled. The priority manager assigns to the modules modifiable priorities which are then taken into account when the modules are activated by the scheduler.

16 Claims, 2 Drawing Sheets

FOREIGN PATENT DOCUMENTS

| | | |
|---|---|---|
| DE | 4445651 | 6/1996 |
| DE | 69027515 | 1/1997 |
| DE | 19731116 | 1/1999 |
| EP | 0432978 | 7/1991 |
| JP | 03128542 A * | 5/1991 ........... 340/825.5 A |
| WO | WO 97/13064 * | 4/1997 |

* cited by examiner

CONTROL DEVICE FOR A SYSTEM, AND METHOD FOR OPERATING THE CONTROL DEVICE

FIELD OF THE INVENTION

The present invention relates to a control device for a system, and to a method for operating the control device.

BACKGROUND INFORMATION

International Patent Publication No. WO 97/13064 describes a control device for a system and a method for operating a control device in which a plurality of activatable modules are provided. These modules are activated by a scheduler which takes into account priorities that are assigned to the modules. In this context, however, the priorities assigned to the modules are fixed and cannot be modified.

SUMMARY OF THE INVENTION

The control device according to the present invention and the method according to the present invention for operating the control device have the advantage that the sequence control system for the modules is improved as a result of modifiable priorities. In this fashion, in particular, a plurality of modifiable conditions can be taken into account for the sequence control system, i.e. for activating and executing modules.

By taking into account the time period during which the particular module is activated or deactivated, it is possible to ensure that modules which have not been executed for some time or have been executed quite recently are taken into consideration accordingly. By taking into account system states, the priority of modules can be made dependent on external states. In an advantageous manner, both methods are linked to one another so as to ensure the greatest possible flexibility in the activation of modules. Increasing the priority upon activation ensures that a certain minimum run time is available to modules. By taking into account the absolute time, it is possible to implement positive run conditions which depend on an absolute time signal. Advantageously, the scheduler follows a selection process for the modules in which higher-priority modules are given preferred consideration.

DETAILED DESCRIPTION

Figure 1:
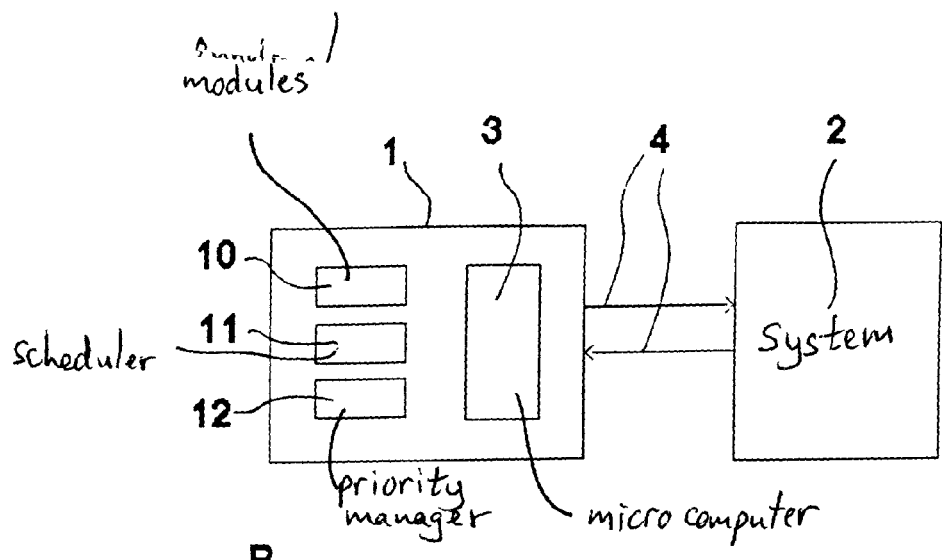
FIG. 1 shows a control device and a system according to the present invention.

FIG. 1 shows a control device 1 which is connected via connecting lines 4 to a system 2 to be controlled. Control device 1 has a microcomputer 3 which is provided for the execution of modules 10, 11, 12. Module 10 represents a plurality of modules, which are functional modules. Such functional modules 10 are provided in order to control or diagnose system 2. Module 11 is a scheduler, and module 12 is a module which acts as priority manager.

System 2 can be any desired technical system which is controlled by a control device 1. For example, system 2 can be a motor vehicle, an internal combustion engine, or a transmission. Such system 2 is equipped with a plurality of sensors and a plurality of actuators. Actuation data generated by control device 1 can be transmitted via connecting lines 4 to the actuators of system 2 (arrow pointing toward system 2). In addition, measured values of sensors of system 2 can be transferred via connecting lines 4 to control device 1 (arrow pointing toward control device 1). Control device 1 thus receives data concerning states of system 2 which are processed by control device 1 and converted, as a function of desired states (for example, accelerator pedal position in a motor vehicle), into control data for system 2.

Control device 1 is schematically illustrated with multiple modules 10, 11, 12 and microcomputer 3. Other hardware components usually used for control device 1 are not illustrated herein. Modules 10, 11, 12 are usually configured as program modules, but hardware modules which perform the corresponding functions can also be used. A function module 10 configured as a program module is a sequence of program instructions which are activated or deactivated as a unit by scheduler 11. In this context, functions which present themselves to the user as a unit or are used to control a unified function can be divided into multiple modules managed separately by scheduler 11. Function modules 10 are required for the processing of direct control tasks or diagnostic tasks. These modules analyze control data of system 2, and as a function of predefined setpoints generate corresponding control data for system 2. An input signal of a function module of this kind can consist, for example in a motor vehicle, of the engine speed and the setpoint information in the gas pedal position, from which a corresponding control datum for the engine is then generated. Function modules 10 which monitor proper operation of system 2 can also be provided. In a motor vehicle, for example, the functionality of the catalytic converter must be checked during vehicle operation based on regulatory stipulations. This is done by activating, from time to time, a corresponding function module 10 which checks the operation of the catalyst by analyzing signals from the lambda probe.

Function modules 10 can be in the active or inactive state. In the inactive state, the tasks connected with the module, such as diagnosis or control of elements of the system, are not executed. This means in particular that inactive modules read in data from the system only to test their readiness to operate, and that no data are output to system 2. In the inactive state, however, the modules can still exchange data with, for example, microcomputer 3. In particular, it should still be possible to exchange data between function modules 10 and scheduler 11 data concerning the activation of a module (e.g. activation capability or request). Since not all function modules 10 are required in every operating state of system 2, at least a portion of those modules can be inactivated. Activation of the individual function modules is accomplished by way of a sequence control system which decides which function modules 10 to execute. Scheduler 11 and priority manager 12 are part of this sequence control system. The sequence control system can make the activation of individual function modules dependent upon specific external conditions. For example, function modules 10 which have to do, for example, with the ignition or fuel injection systems of a gasoline engine are activated as a function of the crankshaft position of the engine. Similarly, function modules 10 which have to do with the diagnosis of system 2 are activated as a function of operating states of system 2. What is essential here is that multiple function modules 10 can be processed concurrently, meaning that the processing of one module is not yet complete while a different module is also being processed simultaneously. A microcomputer 3 can only execute a single instruction which is assigned to a specific module. Simultaneous processing thus means, in this context, that modules which are being processed simultaneously are provided for the allocation of computing time, so that the functions connected with the corresponding modules are performed.

Scheduler 11 and priority manager 12 are part of the sequence control system which decides which modules are activated and which are not. In this context, it is the task of priority manager 12 to assign priorities to function modules 10 and to modify those priorities for sequence control purposes. The task of scheduler 11 is then to decide, as a function of those priorities, which function modules 10 are in the active state and which function modules 10 are in the inactive state. The ways in which priority manager 12 operates are explained below with reference to FIGS. 2 through 4.

Figure 2:
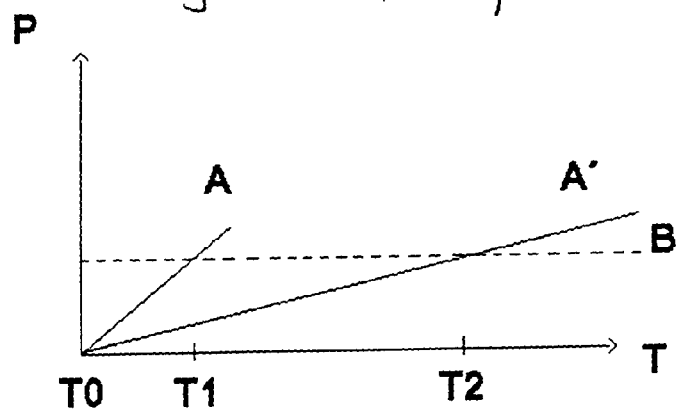
FIG. 2 shows a first graph for allocating priorities to modules.

In FIG. 2, priority p is plotted against a time t on a diagram. What is plotted as time t here is the time during which a module is in a specific state, i.e. either active or inactive. The diagram in FIG. 2 shows, as examples, the priorities of modules A and B. In addition, an alternative illustration A' is shown with reference to module A. Module B serves only as a comparison module, and is therefore depicted as having a constant priority over the entire time period. At time t0, module A has a priority O. This time t0 can be defined, for example, by the fact that at that time, module A has informed the sequence control system, i.e. either scheduler 11 or priority manager 12, that it is now ready to run. Time t is then therefore to be understood as a waiting time, since priority manager 12 is continuously increasing the priority of module A. At time t1, the priority of module A then exceeds the constant priority of module B, so that at time t1, scheduler 11 will activate module A and shift module B into an inactive state. This applies, of course, only on the assumption that modules A and B are ready to run, but must not run simultaneously. Priority manager 12 thus assigns a priority to module A as a function of a time period.

A further possibility for assigning priorities to a module results from the comparison of module A and module A'. The priority profiles depicted in FIG. 2 for modules A and A' differ in terms of the increase in priority per unit time. Module A' is not activated until a much later time t2, since the priority increase for this module A' is less than the priority increase of module A. The difference in slopes results from the fact that the waiting time t is additionally associated (for example, by multiplication) with the intensity of a state of system 2. The state of system 2 envisioned here is, in particular, the intensity of a sensor signal of system 2. The more intense the measured value of the sensor of system 2, the greater the slope of the priority of module A or A'. A nonlinear profile for the priority of A or A' may also result in this case.

A further possibility for assigning a priority to the modules consists in assigning the modules a priority exclusively as a function of a sensor signal. In the case of an engine, for example, provision could be made for the priority of a module to be associated directly with the engine speed, i.e. the higher the engine speed, the higher the priority of a specific module becomes.

Figure 3:
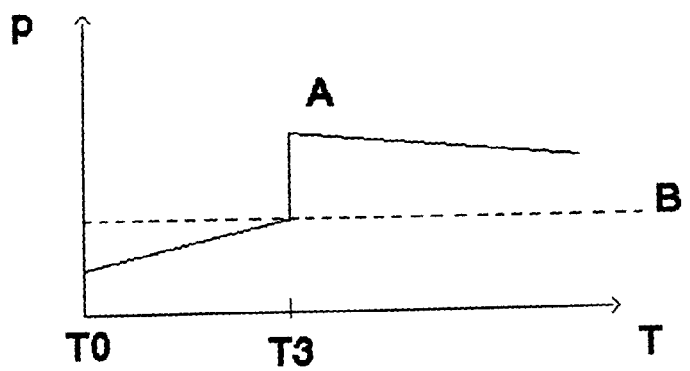
FIG. 3 shows a second graph for allocating the priorities to the modules.

FIG. 3 shows a further method with which priority manager 12 allocates a priority to a module A. In FIG. 3 as well, a module B with constant priority is shown for comparison. In the case of module A shown in FIG. 3, the priority once again increases linearly between times t0 and t3 as a function of the waiting time t. At time t3, module A is activated by scheduler 11. The priority manager then abruptly assigns an increased priority to module A. This is necessary in order to ensure that module A is now processed for a specific time. This is necessary in particular if the competing module B does not, as shown here, have a constant priority but rather itself has a priority which rises slightly over time; or if, as depicted in FIG. 3, the priority of module A decreases slightly after activation of module A (time period following time t3). The reason is that in both of these cases, there would otherwise be a continuous switching back and forth between module A and module B, i.e. module A would be respectively activated and then deactivated at short time intervals. Priority manager 12 is therefore designed so that when a module is activated, an increase in priority is abruptly applied in order to achieve a certain hysteresis in the switching back and forth between modules of similar priority.

Figure 4:
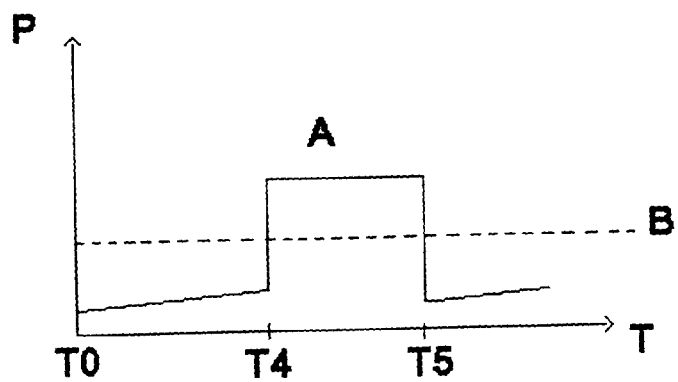
FIG. 4 shows a third graph for allocating the priorities to the modules.

A further manner in which the priority manager can allocate a priority to a module A is shown in FIG. 4. In FIG. 4, an absolute time—for example an absolute time after a motor vehicle has been started—is plotted on the time axis t. The absolute times t4 and t5 define a time window, module A being given a very high priority within this time window. With a priority assignment of this kind, it is possible to execute a module preferentially as a function of an absolute time. Outside this time window, the priority of module A can then be managed in a conventional manner, for example by continuously increasing the priority with a waiting time of module A, as also shown in FIG. 4. An absolute time window of this kind is desirable, for example, if specific function modules absolutely must be executed in specific time windows. This is the case, for example, with specific diagnostic functions such as those used for motor vehicles. It is necessary in this case to ensure that for standardized tests, which often contain only a single time window that is suitable for a specific function test, the function modules associated therewith are also executed. Outside the time window, provision is again made, by way of a normal priority assignment based on waiting time or the like, for the corresponding function modules to be invoked at least occasionally.

As a function of the priorities that were assigned by priority manager 12 to the individual function modules 10, scheduler 11 then determines which modules are activated and which modules are inactivated. This is done, for example, by activating scheduler module 11 at regular time intervals and then activating or deactivating function modules 10 as a function of the priorities. Another possibility may consist in always activating scheduler module 11 when a function module 10 completes its activity, since at that point as well, another decision can be made as to which modules can and cannot then run. Another possibility for invoking scheduler 11 consists in making the activation of scheduler module 11 dependent on external signals, for example sensor signals of system 2.

Figure 5:
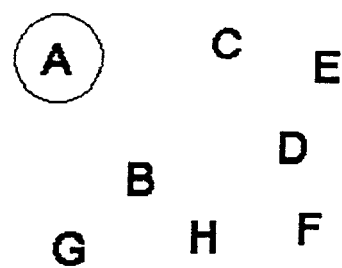
FIG. 5 shows a first step for a selection process using a scheduler.
Figure 6:
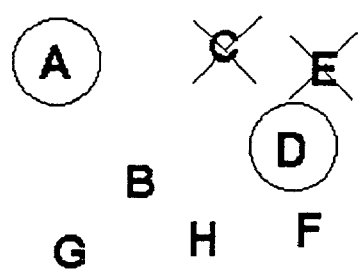
FIG. 6 shows a second step for the selection process using the scheduler.
Figure 7:
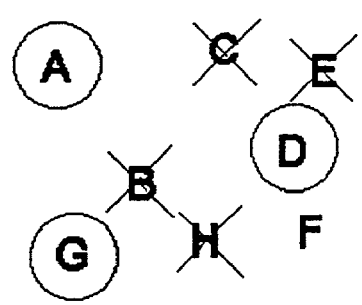
FIG. 7 shows a third step for the selection process using the scheduler.
Figure 8:
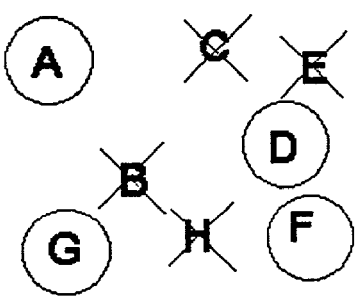
FIG. 8 shows a fourth step for the selection process using the scheduler.

An explanation will now be given, with reference to FIGS. 5-8, as to how scheduler module selects the modules to be activated as a function of the priorities of function modules A, B, C, D, E, F, G, and H. From the set of modules A through H, shown in FIG. 5, that are ready to run, i.e. awaiting activation, the module with the highest priority is selected first. In the present case this is module A, which is shown in FIG. 5 by a circle. Scheduler module 11 then determines whether further modules are present which must not run simultaneously with module A. This may be due, for example, to the fact that module A accesses specific actuators and no other modules must influence those actuators at the same time. It may also be the case that module A influences sensor values which are required by other modules. Interdependencies of this kind between modules can be stored, for example, in a list which scheduler 11 can access. In the present case, for example, the behavior is such that modules C and E must not be active simultaneously with module A. These modules are therefore deleted from the set, as shown in FIG. 6. What then remains is a residual set in which module A which has already been selected, and the deleted modules C and E which must not be activated together with module A, are no longer present. In the present example this set is constituted by elements B, D, F, G, and H. From this residual set, the module with the highest priority—in the present example, module D—is once again selected. As shown in FIG. 7, modules B and H must not be activated simultaneously with module D, so those modules are also deleted. The remaining residual set, with modules D and F, again no longer contains the deleted modules and the modules already selected. In this residual set, module D has a higher priority than module F, so that module D is selected in the next step. The residual set which now remains contains only module F, which may be activated simultaneously with module D, s that in the last step (see FIG. 8), module F is also selected for activation. Scheduler 11 has thus also determined that modules A, D, G, and F are to be active because of the priorities and interdependencies. If one of the modules that has now been deleted was activated prior to this determination, scheduler 11 transfers that module into a deactivated state. If one of the selected modules was previously deactivated, that module is transferred by scheduler 11 into the activated state.

If it happens, in the aforesaid cases in which scheduler 11 must select a module with the highest priority, that more than one module possesses the same highest priority, the scheduler can then create a sequence for those equal-priority modules using any desired further criteria. In FIGS. 5-8, for example, alphabetical order (assuming equal priority) can be utilized for the decision.

What is claimed is:

1. A control device for controlling a system, comprising:
a plurality of activatable modules, each of the activatable modules having a respective corresponding priority value;
a scheduler activating the activatable modules as a function of the respective corresponding priority value of each of the activatable modules to provide activated modules, the activated modules generating data by analyzing states of the system; and
a priority manager continuously modifying the respective corresponding priority value of each of at least one of the activatable modules individually to one of increase and decrease the respective corresponding priority value relative to the priority value of another of the activatable modules,
wherein the priority manager modifies the respective corresponding priority value of a particular module of the activatable modules as a function of a time period in which the particular module is one of activated and deactivated.

2. A control device for controlling a system, comprising:
a plurality of activatable modules, each of the activatable modules having a respective corresponding priority value;
a scheduler activating the activatable modules as a function of the respective corresponding priority value of each of the activatable modules to provide activated modules, the activated modules generating data by analyzing states of the system; and
a priority manager continuously modifying the respective corresponding priority value of each of at least one of the activatable modules individually to one of increase and decrease the respective corresponding priority value relative to the priority value of another of the activatable modules,
wherein the priority manager modifies the respective corresponding priority value of a particular module of the activatable modules as a function of the states of the system and a time period during which the particular module is one of activated and deactivated.

3. A control device for controlling a system, comprising:
a plurality of activatable modules, each of the activatable modules having a respective corresponding priority value;
a scheduler activating the activatable modules as a function of the respective corresponding priority value of each of the activatable modules to provide activated modules, the activated modules generating data by analyzing states of the system; and
a priority manager continuously modifying the respective corresponding priority value of each of at least one of the activatable modules individually to one of increase and decrease the respective corresponding priority value relative to the priority value of another of the activatable modules,
wherein the priority manager modifies the respective corresponding priority value of a particular module of the activatable modules as a function of an activation message which indicates that the particular module has been activated.

4. The control device according to claim 3, wherein the priority manager modifies the respective corresponding priority value of the particular module as a further function of a corresponding deactivation message.

5. A control device for controlling a system, comprising:
a plurality of activatable modules, each of the activatable modules having a respective corresponding priority value;
a scheduler activating the activatable modules as a function of the respective corresponding priority value of each of the activatable modules to provide activated modules, the activated modules generating data by analyzing states of the system; and
a priority manager continuously modifying the respective corresponding priority value of each of at least one of the activatable modules individually to one of increase and decrease the respective corresponding priority value relative to the priority value of another of the activatable modules,
wherein the priority manager modifies the respective corresponding priority value of a particular module of the activatable modules as a function of absolute time signals.

6. A control device for controlling a system, comprising:
a plurality of activatable modules, each of the activatable modules having a respective corresponding priority value;
a scheduler activating the activatable modules as a function of the corresponding priority value of each of the activatable modules to provide activated modules, the activated modules generating data by analyzing states of the system; and a priority manager continuously modifying the respective corresponding priority value of each of at least one of the activatable modules individually to one of increase and decrease the respective corresponding priority value relative to the priority value of another of the activatable modules;

wherein the scheduler selects a first module having a highest priority for an activation, the first module being selected from a set of the activatable modules awaiting the activation, wherein the scheduler assembles a residual set of the activatable modules from the set of the activatable modules, the residual set excluding the first module and excluding second modules, the second modules being those of the activatable modules which must not be activated simultaneously with the first module, and wherein the scheduler selects third modules from the residual set of the activatable modules for the activation.

7. The control device according to claim 6,
wherein the scheduler repeatedly selects an additional one of the activatable modules for the activation, each additional one having a respective highest priority,
wherein the scheduler assembles the residual set of the activatable modules which exclude modules already selected for the activation and excludes fourth modules which must not be activated simultaneously with the modules already selected for the activation, and
wherein the scheduler continues to repeatedly select modules and to assemble the residual set until the residual set does not contain any of the activatable modules.

8. The control device according to claim 6, wherein, after the scheduler selects the modules, the scheduler verifies that the selected modules are activated and unselected modules of the activatable modules are not activated.

9. The control device according to claim 6, wherein the system includes one of a motor vehicle, an engine and a transmission.

10. A method for operating a control device which controls a system, the control device including a plurality of activatable modules, the method comprising the steps of:
assigning a respective corresponding priority value to each of the activatable modules;
activating the activatable modules as a function of the respective corresponding priority value of each of the activatable modules to provide activated modules;
with the activated modules, generating data by observing states of the system; and
continuously modifying the respective corresponding priority value of each of at least one of the activatable modules individually to one of increase and decrease the respective corresponding priority value relative to the priority value of another of the activatable modules,
wherein the respective corresponding priority value of a particular module of the activatable modules is modified as a function of a time period during which the particular module is one of activated and deactivated.

11. A method for operating a control device which controls a system, the control device including a plurality of activatable modules, the method comprising the steps of:
assigning a respective corresponding priority value to each of the activatable modules;
activating the activatable modules as a function of the respective corresponding priority value of each of the activatable modules to provide activated modules;
with the activated modules, generating data by observing states of the system; and
continuously modifying the respective corresponding priority value of each of at least one of the activatable modules individually to one of increase and decrease the respective corresponding priority value relative to the priority value of another of the activatable modules,
wherein the respective corresponding priority value of a particular module of the activatable modules is modified as a function of the states of the system and a time period during which the particular module is one of activated and deactivated.

12. A method for operating a control device which controls a system, the control device including a plurality of activatable modules, the method comprising the steps of:
assigning a respective corresponding priority value to each of the activatable modules;
activating the activatable modules as a function of the respective corresponding priority value of each of the activatable modules to provide activated modules;
with the activated modules, generating data by observing states of the system; and
continuously modifying the respective corresponding priority value of each of at least one of the activatable modules individually to one of increase and decrease the respective corresponding priority value relative to the priority value of another of the activatable modules,
wherein the respective corresponding priority value of a particular module of the activatable modules is modified as a function of an absolute time signal.

13. A method for operating a control device which controls a system, the control device including a plurality of activatable modules, the method comprising the steps of:
assigning a respective corresponding priority value to each of the activatable modules;
activating the activatable modules as a function of the respective corresponding priority value of each of the activatable modules to provide activated modules;
with the activated modules, generating data by observing states of the system;
continuously modifying the respective corresponding priority value of each of at least one of the activatable modules individually to one of increase and decrease the respective corresponding priority value relative to the priority value of another of the activatable modules;
before the activating step, selecting a first module having a highest priority for an activation, the first module being selected from a set of the activatable modules awaiting the activation;
assembling a residual set of the activatable modules from the set of the activatable modules, the residual set excluding the first module and excluding second modules, the second modules being those of the activatable modules which must not be activated together with the first module; and
selecting third modules from the residual set of the activatable modules for the activation.

14. The method according to claim 13, further comprising the steps of:
before the activating step, selecting another of the activatable modules for the activation, the selected module having a respective highest priority; and
assembling the residual set of the activatable modules which exclude modules already selected for the activation and excluding fifth modules which must not run simultaneously with the selected modules, wherein modules are selected and the residual set is assembled until the residual set does not contain any of the activatable modules.

15. The method according to claim 13, further comprising the step of:

after the modules are selected, verifying that the selected modules are activated and unselected modules of the activatable modules are not activated, wherein the selected modules are not activated until still-activated modules of the activatable modules, with which the selected modules must not run simultaneously, have been deactivated.

16. The method according to claim 13, wherein the system includes one of a motor vehicle, an engine and a transmission.

* * * * *